(12) United States Patent  
Ingalsbe et al.

(10) Patent No.: US 7,128,653 B1  
(45) Date of Patent: Oct. 31, 2006

(54) DOUBLE CARDAN CENTERING MECHANISM

(75) Inventors: Steven L. Ingalsbe, Toledo, OH (US); James W. Warnke, Toledo, OH (US)

(73) Assignee: Torque-Traction Technologies LLC, Holland, OH (US)

( * ) Notice: Subject to any disclaimer, the term of this patent is extended or adjusted under 35 U.S.C. 154(b) by 9 days.

(21) Appl. No.: 10/405,077

(22) Filed: Apr. 1, 2003

(51) Int. Cl.  
*F16D 3/33* (2006.01)  
*F16D 3/16* (2006.01)

(52) U.S. Cl. .................................. 464/118; 464/905

(58) Field of Classification Search ............... 464/113, 464/114, 117, 118, 136, 904, 905  
See application file for complete search history.

(56) References Cited

U.S. PATENT DOCUMENTS

| 724,068 | A | | 3/1903 | Williams |
| 1,364,522 | A | * | 1/1921 | Roots ........................... 244/22 |
| 2,094,901 | A | * | 10/1937 | Monzee et al. ............. 464/139 |
| 3,470,712 | A | | 10/1969 | Geisthoff et al. |
| 3,823,576 | A | * | 7/1974 | Colletti et al. ................ 464/71 |
| 4,439,075 | A | * | 3/1984 | Wiederkehr ............. 408/239 R |
| 4,650,439 | A | | 3/1987 | Mayhew |
| 5,419,740 | A | | 5/1995 | Koyari et al. |
| 5,618,234 | A | * | 4/1997 | Carden ........................ 464/109 |
| 5,823,881 | A | | 10/1998 | Cornay |
| 6,616,536 | B1 | * | 9/2003 | Herchenbach et al. ...... 464/118 |

FOREIGN PATENT DOCUMENTS

| DE | 1302735 | | 8/1971 | |
| DE | 92614 | | 9/1972 | |
| JP | 4429327 | * | 11/1969 | ................ 464/118 |

OTHER PUBLICATIONS

SAE Universal Joint And Driveshaft Design Manual (AE-7), Sections 3.2.2-3.2.4, pp. 103-125, dated 1991.

* cited by examiner

*Primary Examiner*—Kenneth Thompson  
(74) *Attorney, Agent, or Firm*—MacMillan, Sobanski & Todd, LLC

(57) ABSTRACT

A centering device for a double Cardan universal joint is comprised of a disc-shaped body having a first and second annular face and an annular rim extending about a central axis. A first hollowed protrusion is centrally located on the first annular face, and a second hollowed protrusion is centrally located on the second annular face. A plurality of bearings are built into the disc-shaped body, extending circumferentially about the central axis. The bearings may be contained within two races, with one race located on each annular face, or the bearings may be contained within holes or slots built into the disc-shaped body.

24 Claims, 6 Drawing Sheets

DOUBLE CARDAN CENTERING MECHANISM

TECHNICAL FIELD

This invention relates in general to a centering device for a double universal joint assembly for vehicular drive train systems. In particular, this invention relates to an improved structure for a center stud assembly of a double universal joint adapted for use in a vehicle drive train system and having constant velocity characteristics.

BACKGROUND OF THE INVENTION

Universal joint assemblies are well known devices that provide a driving connection between two members adapted to rotate about non-aligned axes of rotation. Universal joint assemblies are widely used between rotatable drive shaft sections in vehicle drive train systems. A typical universal joint assembly includes a cross having a central body portion with four cylindrical trunnions extending outwardly from the cross. The trunnions are oriented in a single plane and extend at right angles relative to one another, and the trunnions have a common intersection at the center of the central body portion. A hollow cylindrical bearing cup is mounted on the end of each of the trunnions. Needle bearings or similar means are provided between the outer cylindrical surfaces of the trunnions and the inner cylindrical surfaces of the bearings to permit relative rotational movement between the trunnions and the bearings. The bearings that are mounted on an opposed pair of the trunnions can be connected to a first end yoke secured to an end of a first drive shaft section, while the bearings that are mounted on a second opposed pair of the trunnions can be connected to a second end yoke secured to an end of a second drive shaft section. A Cardan universal joint is classified as a non-constant velocity type of universal joint because the instantaneous angular velocities of the driving shaft and the driven shaft will vary with the angle of rotation (although the average angular velocities for a complete revolution are equal).

A double Cardan universal joint is a near-constant velocity universal joint that is used to correct some of the deficiencies in a single Cardan universal joint. A typical double Cardan universal joint is essentially formed by two single Cardan universal joints that are connected by a unitary coupling yoke having a supporting and centering mechanism. Thus, a typical double Cardan universal joint includes a first yoke that is connected to a first journal cross, a coupling yoke having a first end that is connected to the first journal cross and a second end that is connected to a second journal cross, and a second yoke that is connected to the second journal cross. The supporting and centering mechanism is usually provided by mating ball and socket portions provided on the first and second yokes. The coupling yoke cooperates with the supporting and centering mechanism so as to generally bisect the angle between the first and second yokes. As a result, near constant velocity operating characteristics are attained during operation.

An alternative known structure for a double Cardan universal joint is known as a twin ball and centering plate type. In such a joint, the first and second journal crosses are connected together by a two-piece flanged coupling yoke. The first piece of the coupling yoke includes a yoke portion that is connected to the first journal cross and a flange portion. Similarly, the second piece of the coupling yoke includes a yoke portion that is connected to the second journal cross and a flange portion. The two flange portions are connected together so as to define an internal cavity, in which a centering plate is slidably disposed. The centering plate includes an inner socket portion that receives the ball portions of the first and second yokes therein and an outer plate portion that is slidably disposed within the cavity defined by the mating flange portions. Although the twin ball and centering plate double Cardan universal joint provides near-constant velocity rotation, it is limited to relatively low rotational speeds due to friction created by the centering plate when operating at an angle. The sliding mechanism in this type of design also tends to lock up when placed under load. This occurs because existing designs have a flat surface of the sliding mechanism in contact with the housing. This flat surface often becomes cocked when load is applied to the centering mechanism due to the inherent looseness between these two pieces, causing the outer edge to dig into the housing. It would be desirable to create a double Cardan universal joint with a centering plate with minimal rotational friction and that resists locking under load.

SUMMARY OF THE INVENTION

A centering device for a double Cardan universal joint is comprised of a disc-shaped body having a first and second annular face and a circumference extending about a central axis. A first hollowed protrusion is centrally located on the first annular face, and a second hollowed protrusion is centrally located on the second annular face. A plurality of bearings are built into the disc-shaped body, extending circumferentially about the central axis. The bearings may be contained within two races, with one race located on each annular face, or the bearings may be contained within holes or slots built into the disc-shaped body.

According to this invention there is also provided a centering device for a double Cardan universal joint, the centering device including a disc-shaped body having a first annular face, a second annular face and a circumference extending about a central axis. The centering device also includes a first centering stud centrally located on the first annular face, a second centering stud centrally located on the second annular face, a first race on the first annular face extending circumferentially about the central axis, a second race on the second annular face extending circumferentially about the central axis, and a plurality of bearings in the first and second race.

According to this invention there is also provided a centering device for a double Cardan universal joint, the centering device including a disc-shaped body having a first annular face, a second annular face and a circumference extending about a central axis. Also included is a first centering device centrally located on the first annular face, a second centering device centrally located on the second annular face, a plurality of openings extending through the disc-shaped body, and at least one bearing located in each the opening.

According to this invention there is also provided a double Cardan universal joint including a coupling yoke having a first pair of openings and a second pair of openings, a first yoke with a pair of eyelets and a first hollowed protrusion, and a first cross having a first and second pair of trunnions, the first pair of trunnions engaged with the eyelets of the first yoke and the second pair of trunnions engaged with the first pair of openings of the coupling yoke. Also included are a second yoke with a pair of eyelets and a second hollowed protrusion, and a second cross having a first and second pair of trunnions, the second cross first pair of trunnions engaged with the second yoke eyelets and the second pair of trunnions of the second cross engaged with the second pair of openings of the coupling yoke. The double Cardan universal joint also includes a centering device having a disc-shaped body with a first and second annular face and an annular rim extending about a central axis, and further having a first centering stud centrally located on the first annular face and having a centering stud bearing and spherically shaped bearing cup, a second centering stud centrally located on the second annular face and having a centering study bearing and spherically shaped bearing cup, and a plurality of bearings extending circumferentially about the disc-shaped body where the bearings revolve within the annular groove of the coupling yoke.

Various objects and advantages of this invention will become apparent to those skilled in the art from the following detailed description of the preferred embodiment, when read in light of the accompanying drawings.

DETAILED DESCRIPTION OF THE INVENTION

Figure 1:
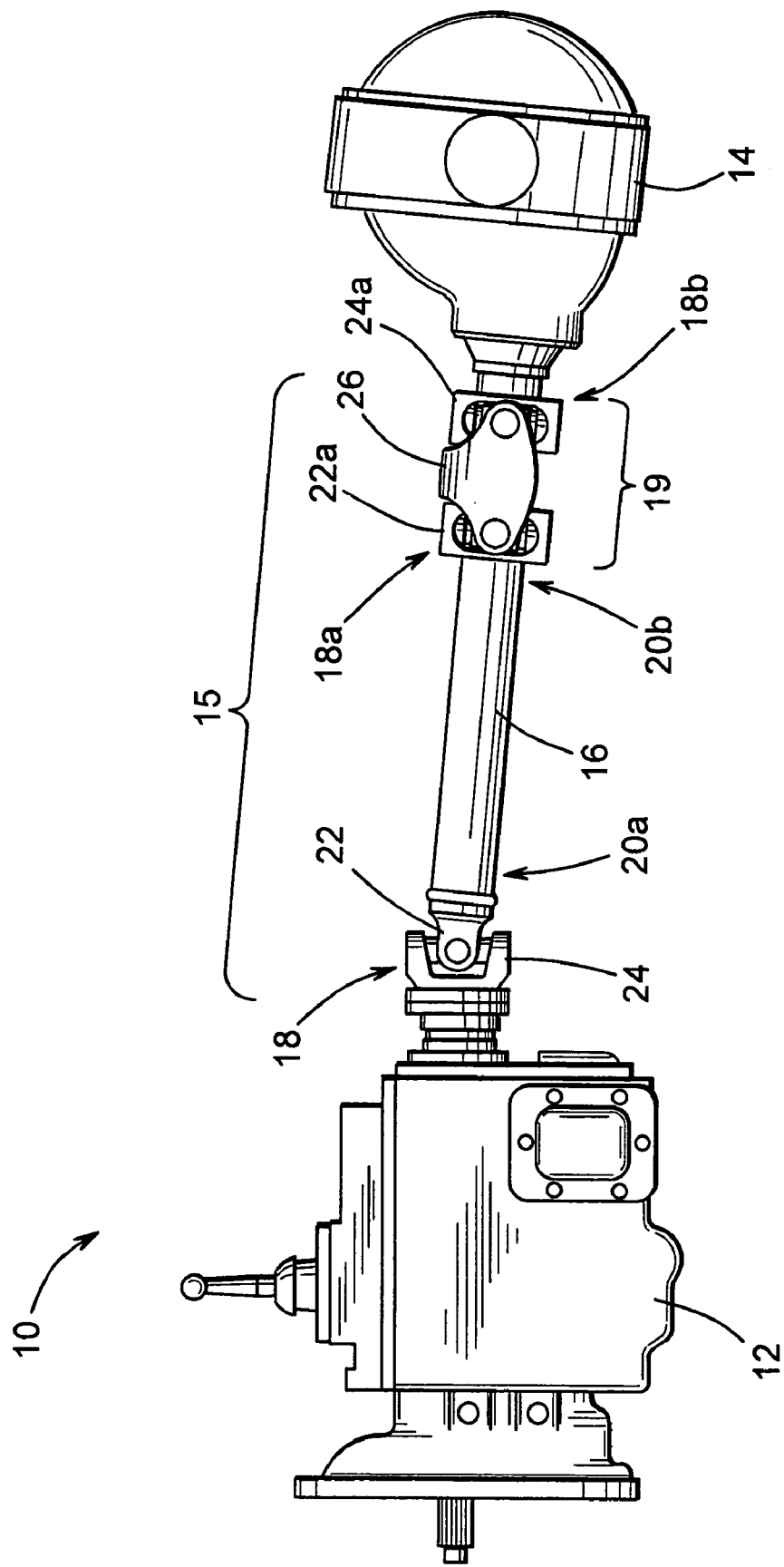
FIG. 1 is a schematic view in elevation of a vehicle drive train.

Referring now to the drawings, there is illustrated in FIG. 1 a vehicle drive train assembly, indicated generally at 10. The drive train assembly 10 includes a transmission 12 having an output shaft (not shown) that is connected to an input shaft (not shown) of an axle assembly 14 through a driveshaft assembly 15. The transmission 12 is rotatably driven by an engine (not shown) or other source of rotational power in a conventional manner. The driveshaft assembly 15 includes a cylindrical driveshaft tube, indicated generally at 16, having a pair of opposed end portions 20a and 20b. The driveshaft tube 16 is preferably formed from an aluminum alloy material, although such is not necessary. Driveshaft tube 16 is shown having a constant diameter throughout the length thereof. However, the driveshaft tube 16 may be formed using a diameter that changes at different locations of the driveshaft tube 16 or with any other desired shape.

Alternatively, the single driveshaft tube 16 may be replaced by a compound driveshaft assembly (not shown) having separate first and second driveshaft sections that are supported by a center bearing assembly between the transmission 12 and the axle assembly 14. The driveshaft tube 16 can be formed from any suitable material, such as a lightweight aluminum alloy (6061 alloy, for example).

The output shaft of the transmission 12 and the input shaft of the axle assembly 14 are typically not co-axially aligned. To accommodate this, a Cardan universal joint 18 is connected to end portion 20a of the driveshaft tube 16 to respectively connect the driveshaft tube 16 to the output shaft of the transmission 12. The Cardan universal joint 18 includes a tube yoke 22 that is secured to the end portion 20a of the driveshaft tube 16 by any conventional means, such as by welding or adhesives. The Cardan universal joint 18 also includes an end yoke 24 that is connected to the output shaft of the transmission 12.

A double Cardan universal joint 19 may be used in place of a single Cardan universal joint 18, as shown between the end portion 20b of the drive shaft tube 16 and the axle assembly 14 in FIG. 1. The double Cardan universal joint 19 uses two Cardan universal joints 18a and 18b linked together in tandem by a coupling yoke 26 to form a single joint 19. A double Cardan universal joint 19 is more advantageous than the single Cardan universal joint 18 because it provides a higher continuous operating angle while operating under constant velocity conditions or near-constant velocity conditions. The double Cardan universal joint 19 includes a tube yoke 22a that is secured to the rearward end portion 20b of the driveshaft tube 16 by any conventional means, such as by welding or adhesives. The double Cardan universal joint 19 further includes an end yoke 24a that is connected to the input shaft of the axle assembly 14. The specific structure of the tube yoke 22a and end yoke 24a will be described in detail below.

Figure 2:
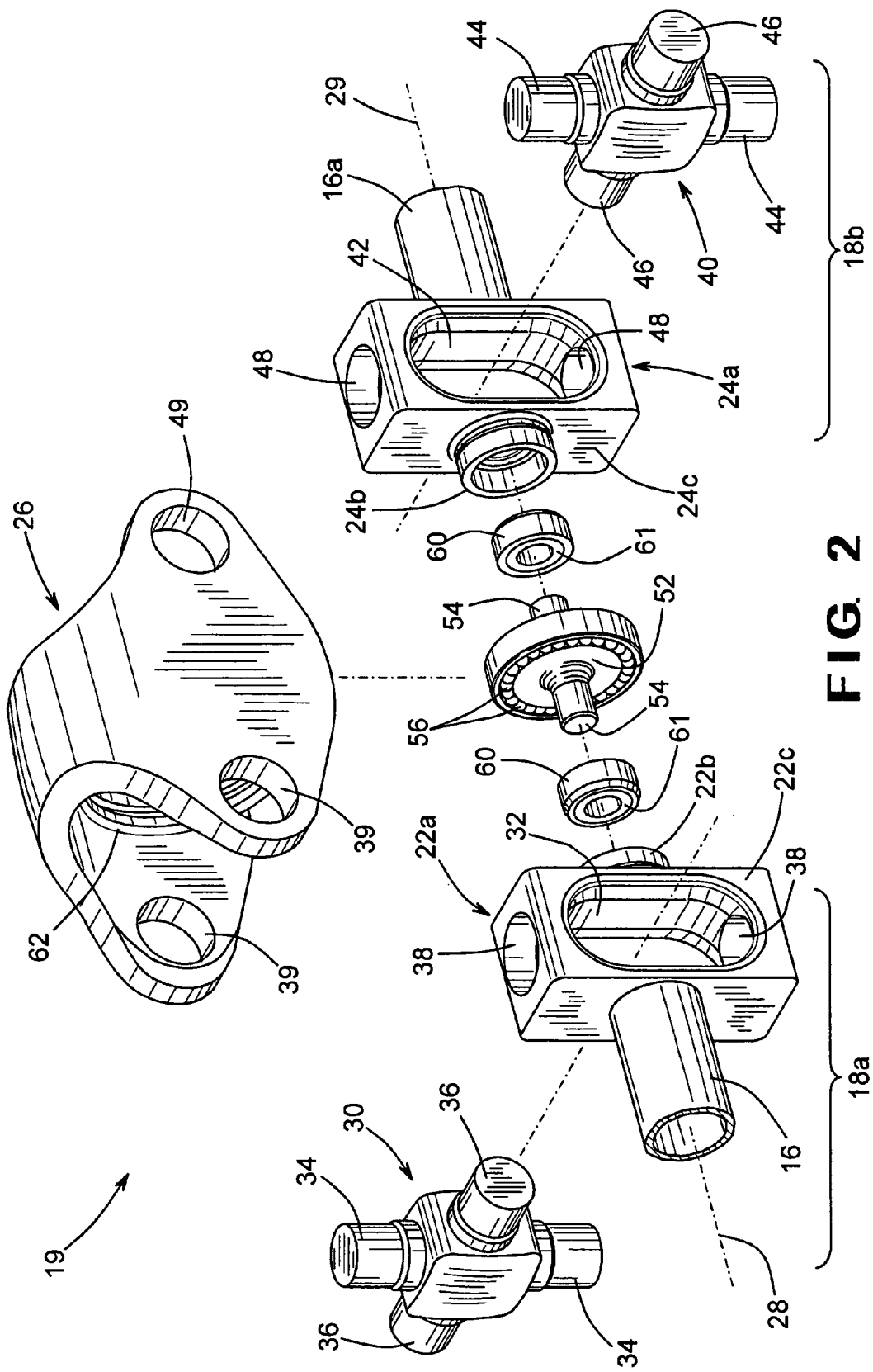
FIG. 2 is an exploded perspective view of a double Cardan universal joint having a centering device in accordance with the invention.

As shown in FIG. 2, this invention relates to an improved centering device, shown generally at 50, for use in a double Cardan universal joint 19. The double Cardan universal joint 19 includes a first yoke 22a having a hollowed protrusion 22b extending from the yoke body 22c and aligned with the rotating axis 28 of driveshaft tube 16. The hollowed protrusion 22b receives a bearing 61 and bearing cup 60 that may rotate and pivot freely within the hollowed protrusion 22b. Preferably, the bearing cup 60 is a spherical bearing cup. The bearing cups are mounted in place by the bearing retainers 60a. The first yoke 22a further includes a first cross 30 having drive yoke trunnions 34 and coupling yoke trunnions 36. Each trunnion 34 and 36 includes a bearing cup and retaining ring (not shown). The first cross 30 is placed into the central opening 32 of the yoke body 22c so the drive yoke trunnions 34 extend into eyelets 38 in yoke 22a. When the double Cardan universal joint 19 is assembled, the coupling yoke trunnions 36 extend through the central opening 32 of the yoke body 22c and through the coupling yoke openings 39 to create the first Cardan universal joint 18a of the double Cardan universal joint 19.

The invention also includes a second yoke 24a having a hollowed protrusion 24b extending from the yoke body 24c and aligned with the rotating axis of the input shaft (not shown) of the axle assembly 14. The hollowed protrusion 24b receives a bearing 61 and bearing cup 60 that may rotate and pivot freely within the hollowed protrusion 24b. Preferably, the bearing cups 60 are spherically shaped bearing cups. The term "spherically shaped" means that a substantial portion of the outer surface of the bearing cups 60 is substantially spherical. However, portions of the bearing cups may deviate from the spherical shape while maintaining a substantially spherical shape without departing from the scope of the invention.

The second yoke 24a includes a second cross 40 having driven yoke trunnions 44 and coupling yoke trunnions 46. Each trunnion 44 and 46 includes a bearing cup and retaining ring (not shown). The second cross 40 is placed into the central opening 42 of the yoke body 24c so the drive yoke trunnions 44 extend into eyelets 48 in yoke 24a. When assembled with the coupling yoke 26, the coupling yoke trunnions 46 extend through the central opening 42 of the yoke body 24c and through the coupling yoke openings 49 to create the second Cardan universal joint 18b of the double Cardan universal joint 19. Although the universal joint in FIG. 2 is shown with the first yoke 22a being a tube yoke and the second yoke 24a being an end yoke, it should be recognized that the specific type of yoke is interchangeable, and the invention could consist of two end yokes, two tube yokes or any other types of mounted yokes without departing from the scope of the invention.

Figure 3:
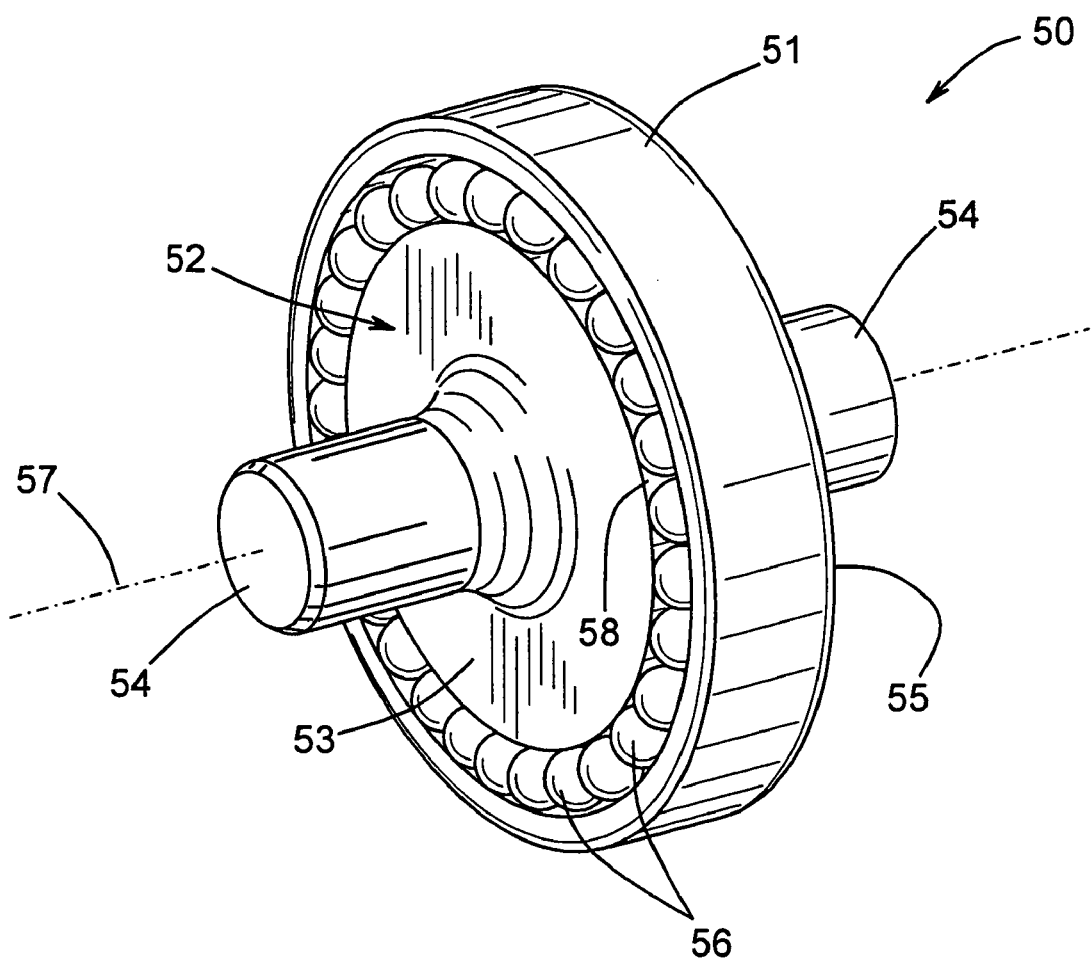
FIG. 3 is a perspective view of one embodiment of the centering device in accordance with the invention.
Figure 4:
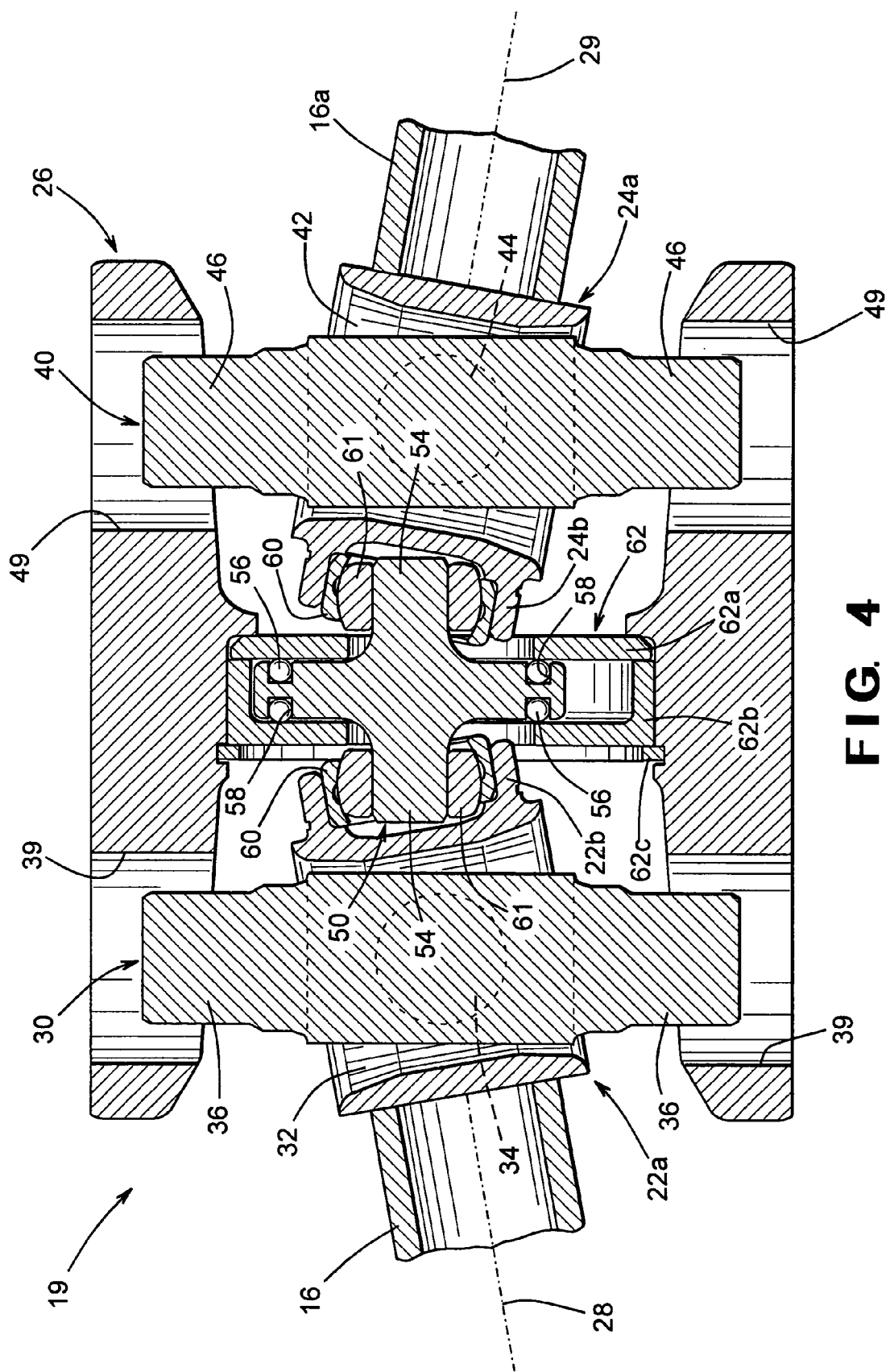
FIG. 4 is a sectional elevation view of a double Cardan universal joint with the centering device embodiment of FIG. 3 in accordance with the invention.

The double Cardan universal joint 19 includes a centering device 50. As shown in FIGS. 2 and 3 the centering device 50, has a disc-shaped body 52 with a first annular face 53, a second annular face 55, and a circumferential or annular rim 51. The centering device 50 also includes two centering studs 54 that are located in the center of each annular face 53 and 55 along a central axis 57. A plurality of bearings 56 extend circumferentially within a race 58 located on each annular face 53 and 55 of the disc-shaped body 52. Although FIG. 3 shows the race 58 as continuous and extending about the entire circumference of each face 53 and 55, smaller sections or arcuate segments of race 58 and bearings 56 may be placed about each face 53 and 55 without departing from the scope of the invention The operation of the centering device 50 is best illustrated in FIG. 4, which shows that the centering studs 54 are partially surrounded by bearings 61 and spherical bearing cups 60. The spherical bearing cups 60 are mounted in place by the bearing retainers 60a, within the hollowed protrusions 22b and 24b. Thus, when yokes 22a and 24a articulate to different angles, the spherical bearing cups 60 pivot within bearing retainers 60a. This allows the centering device 50 to move freely up or down within the annular groove 62 of the coupling yoke 26 in the direction of the growing angle of articulation (i.e., the reflex angle, which has a measure greater than 180 degrees, defined by the axis 28 of the driving member 16 and the axis 29 of the driven member 16a). Meanwhile, the annular groove 62 secures the centering device 50 in place to prevent it from shifting out of an alignment position. The upward movement of the centering device 50 is limited by the impingement of the rim 51 against the annular groove, and this serves as an assembly stop in the double Cardan universal joint 19 to prevent it from being over-angulated. The annular groove 62 may be constructed with multiple detachable components (for example annular flange 62a, annular flange bracket 62b, and locking element 62c) to allow for assembly of the centering device 50 into the annular groove 62.

The bearings 56 in the disc-shaped body 52 of the centering device 50 are an important feature of the invention because they significantly reduce the friction as the centering device 50 slides within the annular groove 62. The bearings 56 provide a smooth contact between the centering device 50 and the annular groove 62 which prevents the centering device 50 from locking up under load. Although the bearings 56 are shown as ball bearings, they may consist of roller bearings, needle bearings, or other bearings known in the art. In the embodiment of FIG. 4, a race 58 is located on each face 53 and 55 of the centering device 50 to support the bearings 56.

Figure 5:
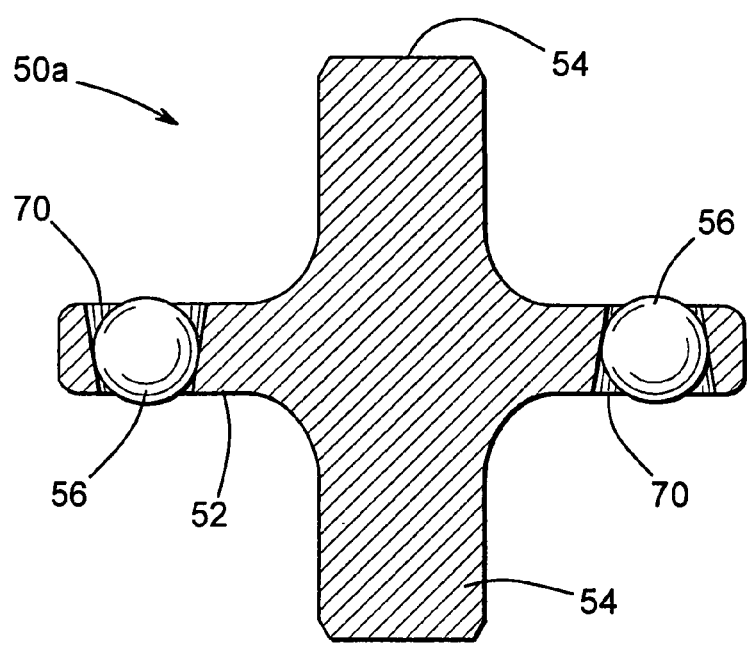
FIG. 5 is a sectional elevation view of an alternate embodiment of a centering device in accordance with the invention.
Figure 6:
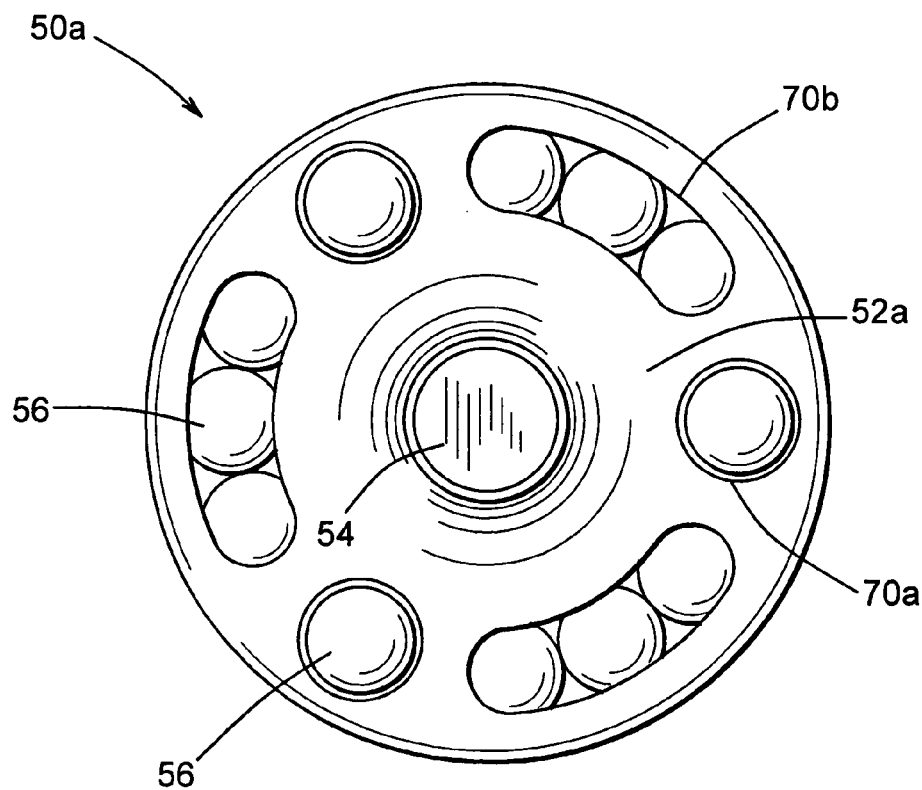
FIG. 6 is a side elevation view of an alternate embodiment of a centering device in accordance with the invention.

FIG. 5 shows an alternate embodiment of the centering device 50a that uses a different bearing design in the body 52a of the centering device 50a. Rather than using two races 58 with a plurality of bearings 56 in each race, the alternate embodiment has openings or holes 70 in the disc-shaped body 52a of the centering device 50a. In the preferred embodiment, the holes 70 are cone-shaped or tapered to support the bearings 56. As shown in FIG. 6, some holes 70a may be sized to rotatably support a single ball bearing 56, while others may be constructed as a slot 70b to hold multiple ball bearings 56. Thus, the holes 70 may contain one or more bearings 56 without departing from the scope of the invention.

Figure 7:
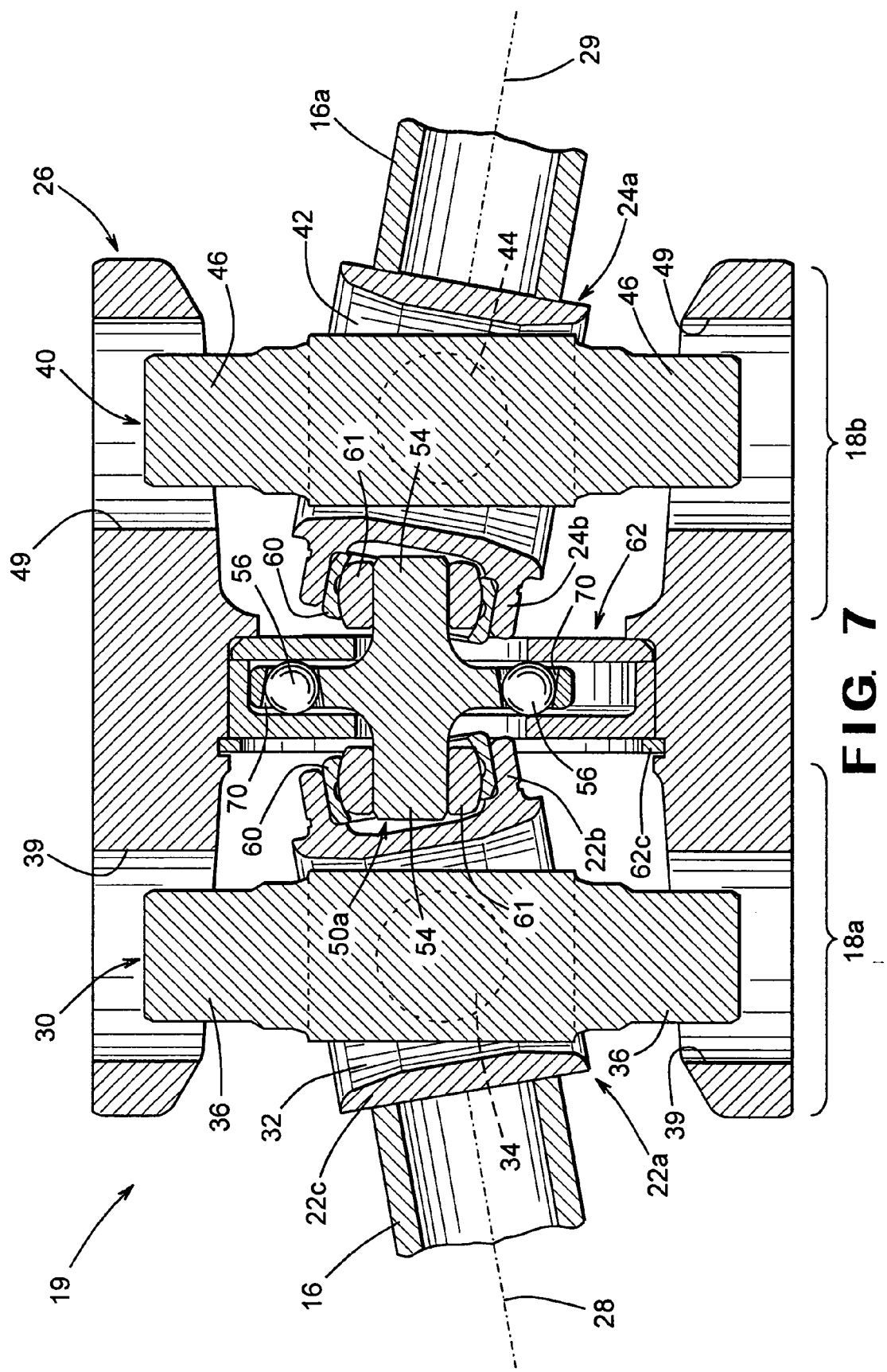
FIG. 7 is a sectional elevation view of a double Cardan universal joint with the centering device embodiment of FIG. 5 in accordance with the invention.

FIG. 7 provides a sectional view of an assembled double Cardan universal joint 19 having a centering device 50a in accordance with the invention using the alternate bearing embodiment of FIG. 5. Drive shaft tube 16 and first yoke 22a are shown at the left side of the figure with first cross 30 extending through the central opening 32 of the yoke body 22c. The coupling yoke trunnions 36 of cross 30 each pass through openings 39 of the coupling yoke 26, while the yoke trunnions 34 pass through the yoke eyelets 38 (not visible in the sectional view of FIG. 7) to form first universal joint 18a. The first yoke 22a has a hollowed protrusion 22b that loosely houses a spherically shaped bearing cup 60 and bearing 61. A centering stud 54 of the centering device 50a is moveably secured within the bearing 61. The centering studs 54 further serve as an assembly stop to prevent over-articulation of yokes 22a and 24a.

The centering device 50a is loosely secured within the annular groove 62 of the coupling yoke 26. Bearings 56 located within the disc-shaped body 52 of the centering device 50a significantly reduce the friction between the centering device 50a and the annular groove 62 as the centering device 50a rotates or shifts up and down during articulation. Thus, the bearings 56 provide a smooth contact between the centering device 50a and the annular groove 62 which prevents the centering device 50a from locking up under load.

A second yoke 24a is shown at the right side of FIG. 7 with second cross 40 extending through the central opening 42 of the yoke body 24c. The coupling yoke trunnions 46 of cross 40 each pass through openings 49 of the coupling yoke 26, while the yoke trunnions 44 pass through the yoke eyelets 48 (not visible in the sectional view of FIG. 7) to form the second universal joint 18b. Second yoke 24a also has a hollowed protrusion 24b that loosely houses a spherically shaped bearing cup 60 and bearing 61. The spherically shaped bearing cup 60 may rotate and pivot freely within the hollowed protrusion 24b which allows the centering device 50a to move up or down within the groove 62 during articulation. The direction of movement of the centering device 50a is towards the growing angle of articulation (i.e., the reflex angle defined by the axis 28 of the driving member 16 and the axis 29 of the driven member).

An annular groove 62 extends centrally through the inner body of yoke coupling 26. In the preferred embodiment, the annular groove 62 is continuous with a circular or annular shape, thus allowing the centering device 50a to revolve freely in the annular groove 62 while being secured from both sides. However, if the bearings 56 are secured from falling out of the race 58, the groove 62 may be broken into multiple arcuate sections or segments that each receive and secure a portion of the disc-shaped body 52 without departing from the scope of the invention.

The operation of the universal joint is best described while viewing FIG. 4 and FIG. 7. As drive shaft tube 16 and first yoke 22a are rotated by a driving force means (not shown), the first yoke 22a transfers torque to the first cross 30 by contact between the opposed yoke trunnions 34 and the yoke eyelets 38 (not shown in sectional view). Torque is then transferred from the cross 30 to the coupling yoke 26 by the coupling yoke trunnions 36 engaging with the coupling yoke openings 39. As the coupling yoke 26 rotates, torque is transferred from the coupling yoke 26 to the second cross 40 by engagement of the coupling yoke trunnions 46 of cross 40 with the coupling yoke openings 49 in the coupling yoke 26. Cross 40 is engaged with the second yoke 24a where yoke trunnions 44 contact the second yoke 24a at yoke eyelets 48. Therefore, torque is effectively transferred from the driving member 16 to the driven member 16a. While this torque transfer is occurring, the centering device 50 or 50a bisects the angle of articulation between the driving axis 28 and the driven axis 29. The centering stud bearings 61 minimize friction between the centering studs 54 and the spherically shaped bearing cups 60 as the bearing cups 60 pivot within the hollowed protrusions 22b and 24b. Also, the bearings 56 in the disc-shaped body 52 of the centering device 50 or 50a minimize friction between the centering device 50 or 50a and the annular groove 62. The result is a double-cardan universal joint 19 with constant velocity characteristics that is resistant to frictional locking.

The principle and mode of operation of this invention have been described in its preferred embodiments. However, it should be noted that this invention may be practiced otherwise than as specifically illustrated and described without departing from its scope.

What is claimed is:

1. A centering device for a double Cardan universal joint comprising:
   a body having a first face and a second face;
   a first centering device located on said first face and supporting a first bearing, said first bearing supporting a first spherical bearing cup;
   a second centering device located on said second face and supporting a second bearing, said second bearing supporting a second spherical bearing cup;
   a plurality of conically-shaped openings extending through said body; and
   a plurality of bearings located in each of said openings.

2. The centering device of claim 1 where said openings are constructed as slots containing a plurality of said bearings.

3. The centering device of claim 2 where said slots are tapered.

4. A double Cardan universal joint comprising:
   a coupling yoke having a first pair of openings, a second pair of openings, and a groove;
   a first yoke with a pair of eyelets and a first hollowed protrusion;
   a first cross having a first and second pair of trunnions, said first pair of trunnions engaged with said eyelets of said first yoke and said second pair of trunnions engaged with said first pair of openings of said coupling yoke;
   a second yoke with a pair of eyelets and a second hollowed protrusion;
   a second cross having a first and second pair of trunnions, said second cross first pair of trunnions engaged with said second yoke eyelets and said second pair of trunnions of said second cross engaged with said second pair of openings of said coupling yoke;
   a centering device having a body with a first face and a second face, a first centering stud located on said first face and having a centering stud bearing and spherically shaped bearing cup, a second centering stud located on said second face and having a centering stud bearing and spherically shaped bearing cup, and a plurality of ball bearings extending circumferentially about said body where said ball bearings revolve within said groove of said coupling yoke.

5. The universal joint of claim 4 where said bearings are located within races located on each of said first and second faces of said centering device.

6. The universal joint of claim 4 where said bearings are located within openings in said body of said centering device.

7. The universal joint of claim 6 where said openings are conical in shape.

8. The universal joint of claim 6 where said openings are constructed as slots containing a plurality of said bearings.

9. The universal joint of claim 8 where said slots are tapered.

10. A double Cardan universal joint comprising:
    a first yoke including a first pair of eyelets;
    a first cross including a first pair of trunnions supported within said first pair of eyelets and a second pair of trunnions;
    a second yoke including a second pair of eyelets;
    a second cross including a first pair of trunnions supported within said second pair of eyelets and a second pair of trunnions;
    a coupling yoke including a first pair of openings that supports said second pair of trunnions of said first cross and a second pair of openings that supports said second pair of trunnions of said second cross; and
    a centering device including a body that cooperates with said first and second yokes for movement therewith, said body including a first face having a first race provided therein that contains a first plurality of bearings and a second face having a second race provided therein that contains a second plurality of bearings, said first and second pluralities of bearings engaging portions of said coupling yoke, said body further including a first centering stud that extends from said first face of said body into cooperation with a first hollow protrusion provided on said first yoke and a second centering stud that extends from said second face of said body into cooperation with a second hollow protrusion provided on said second yoke.

11. The double Cardan universal joint defined in claim 10 wherein said first race extends continuously throughout said first face, and wherein said second race extends continuously throughout said second face.

12. The double Cardan universal joint defined in claim 11 wherein said first and second pluralities of bearings are ball bearings.

13. The double Cardan universal joint defined in claim 11 wherein said first and second races prevent radial movement of said first and second pluralities of bearings relative to said body.

14. The double Cardan universal joint defined in claim 10 further including a first bearing that is supported on said first centering stud within said first hollow protrusion and a second bearing that is supported on said second centering stud within said second hollow protrusion.

15. The double Cardan universal joint defined in claim 14 further including a first spherical bearing cup that is supported on said first bearing within said first hollow protrusion and a second spherical bearing cup that is supported on said second bearing within said second hollow protrusion.

16. A double Cardan universal joint comprising:
    a first yoke including a first pair of eyelets;
    a first cross including a first pair of trunnions supported within said first pair of eyelets and a second pair of trunnions;

a second yoke including a second pair of eyelets;

a second cross including a first pair of trunnions supported within said second pair of eyelets and a second pair of trunnions;

a coupling yoke including a first pair of openings that supports said second pair of trunnions of said first cross and a second pair of openings that supports said second pair of trunnions of said second cross; and a centering device including a body that cooperates with said first and second yokes for movement therewith, said body having a plurality of openings formed therethrough, each of said plurality of openings having a bearing disposed therein, said bearings engaging portions of said coupling yoke.

17. The double Cardan universal joint defined in claim 16 wherein each of said plurality of openings has a single bearing disposed therein.

18. The double Cardan universal joint defined in claim 16 wherein each of said plurality of openings has a plurality of bearings disposed therein.

19. The double Cardan universal joint defined in claim 16 wherein some of said plurality of openings have a single bearing disposed therein and others of said plurality of openings have a plurality of bearings disposed therein.

20. The double Cardan universal joint defined in claim 16 further including a first centering stud that extends from a first face of said body into cooperation with a first hollow protrusion provided on said first yoke and a second centering stud that extends from a second face of said body into cooperation with a second hollow protrusion provided on said second yoke.

21. The double Cardan universal joint defined in claim 20 further including a first bearing that is supported on said first centering stud within said first hollow protrusion and a second bearing that is supported on said second centering stud within said second hollow protrusion.

22. The double Cardan universal joint defined in claim 21 further including a first spherical bearing cup that is supported on said first bearing within said first hollow protrusion and a second spherical bearing cup that is supported on said second bearing within said second hollow protrusion.

23. The double Cardan universal joint defined in claim 16 wherein each of said plurality of openings is tapered.

24. The double Cardan universal joint defined in claim 23 wherein said plurality of openings is tapered in opposite directions.

* * * * *